May 16, 1950 G. A. A. WIESSLER 2,507,657
AIRCRAFT WITH MIXED TYPE PROPULSION
AND SUSTAINING MEANS
Filed Sept. 25, 1948 6 Sheets-Sheet 2

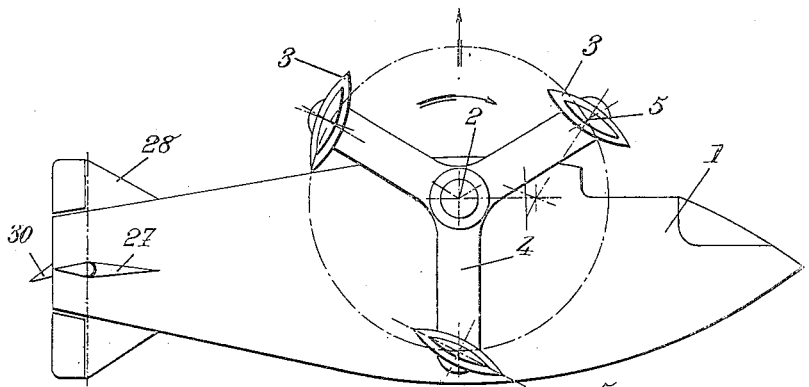
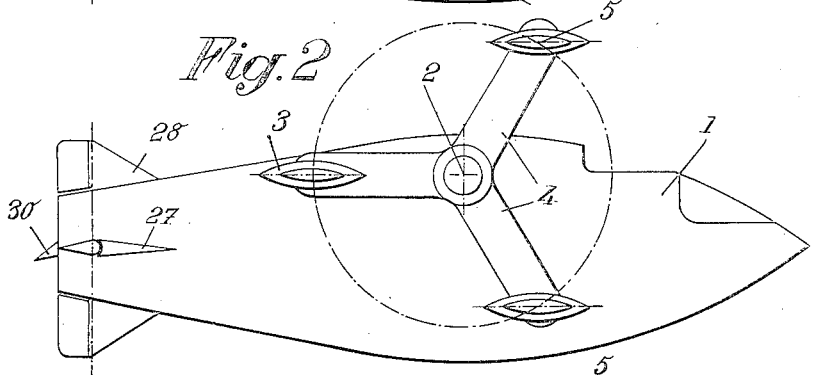
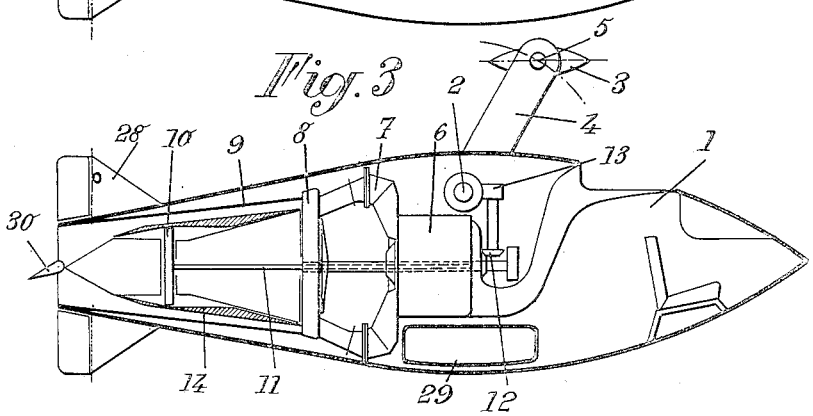

INVENTOR
GASTON, ANTOINE, AUGUSTE WIESSLER
BY

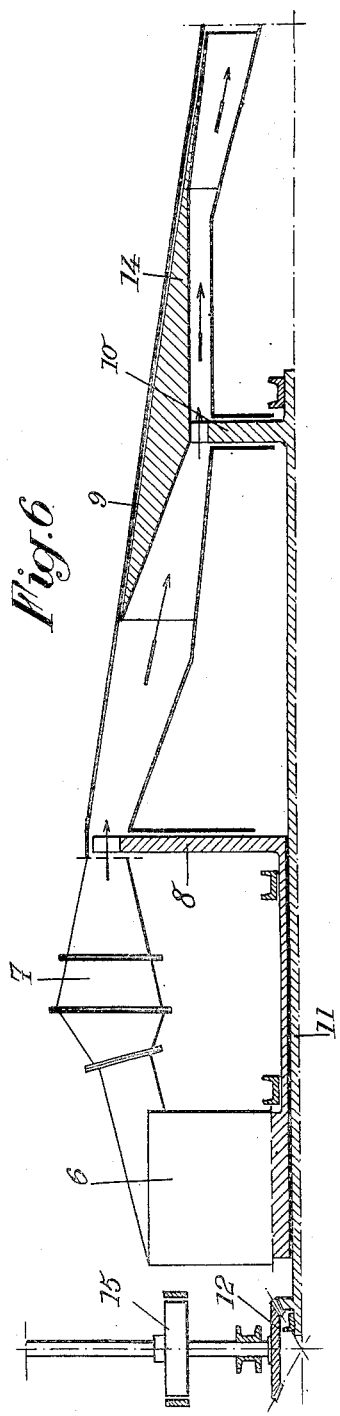
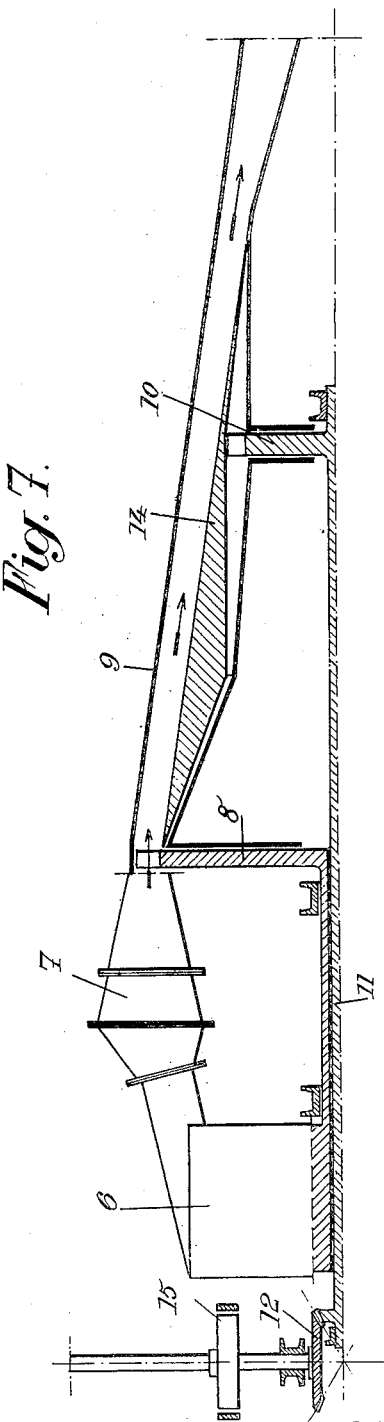

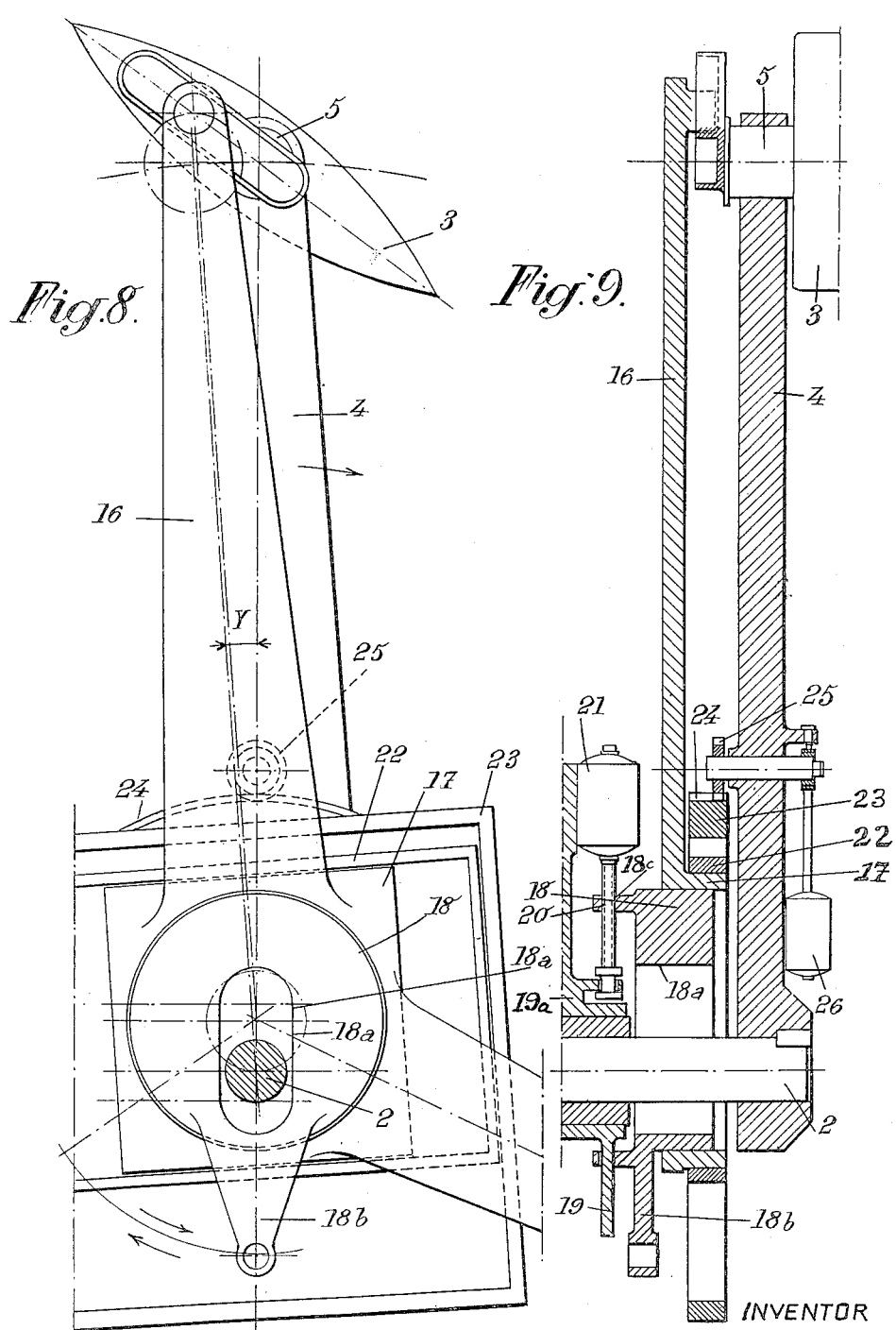

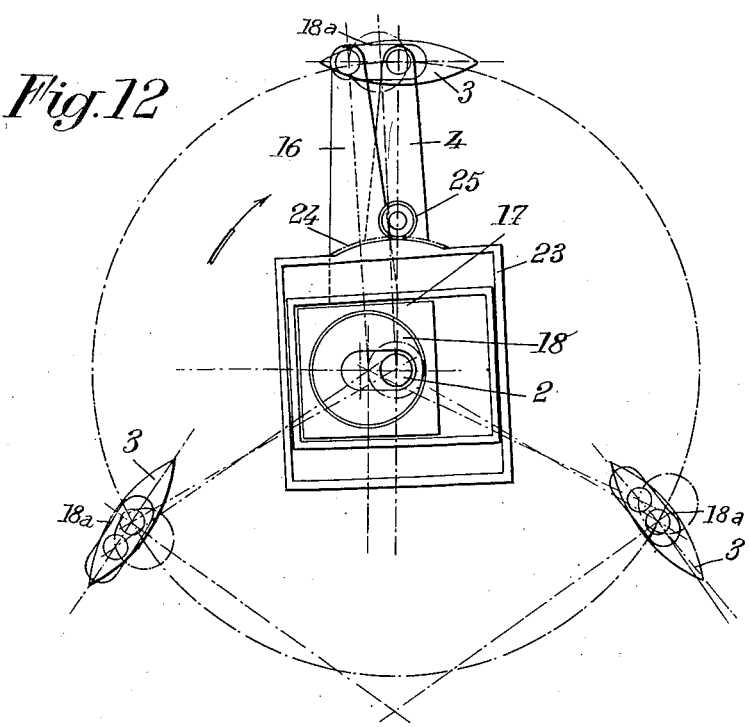
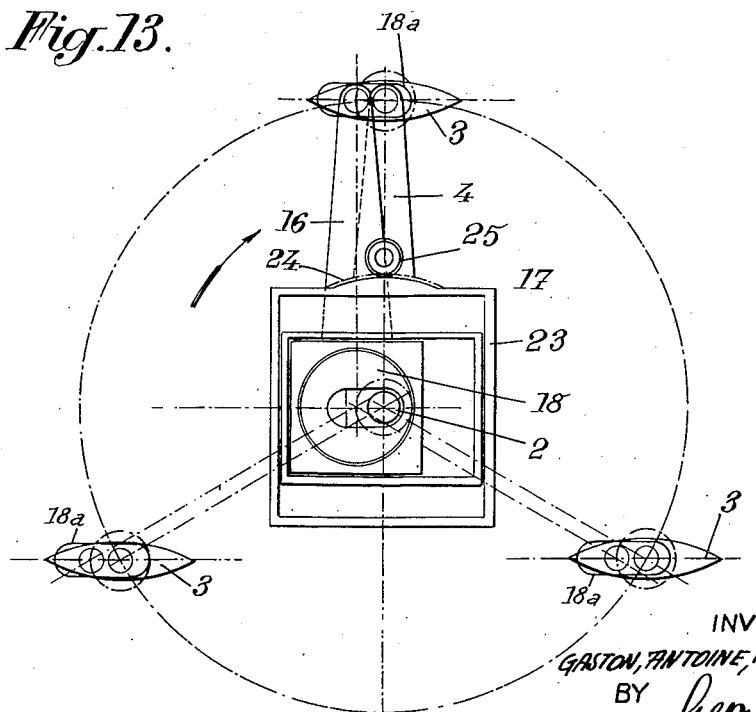

Patented May 16, 1950

2,507,657

UNITED STATES PATENT OFFICE 2,507,657

AIRCRAFT WITH MIXED TYPE PROPULSION AND SUSTAINING MEANS

Gaston Antoine Auguste Wiessler, Paris, France

Application September 25, 1948, Serial No. 51,200
In France July 21, 1948

4 Claims. (Cl. 244—9)

1

The present invention relates to improvements in aircraft with mixed type propulsion and sustaining means and its chief object is to provide an aircraft which is better adapted to meet the requirements of practice than those known up to this time.

A preferred embodiment of my invention will be hereinafter described with reference to the accompanying drawings, given merely by way of example, and in which:

Fig. 1 is a side view, in flight and with the rotor in rotation, of an aircraft made according to my invention;

Fig. 2 is a view of the same aircraft with the rotor fixed in position;

Fig. 3 is a longitudinal diagrammatic vertical fore-and-aft section of the same aircraft;

Figs. 6 and 7 are diagrammatic longitudinal sections showing the engine system of the aircraft in two different positions of utilization, respectively;

Figs. 8 and 9 show, respectively in side elevation and in radial section, the means for operating the rotating blades which constitute the rotor of the aircraft;

Figs. 10 to 13 show the angular positions of said blades in different conditions of operation.

Figure 4:
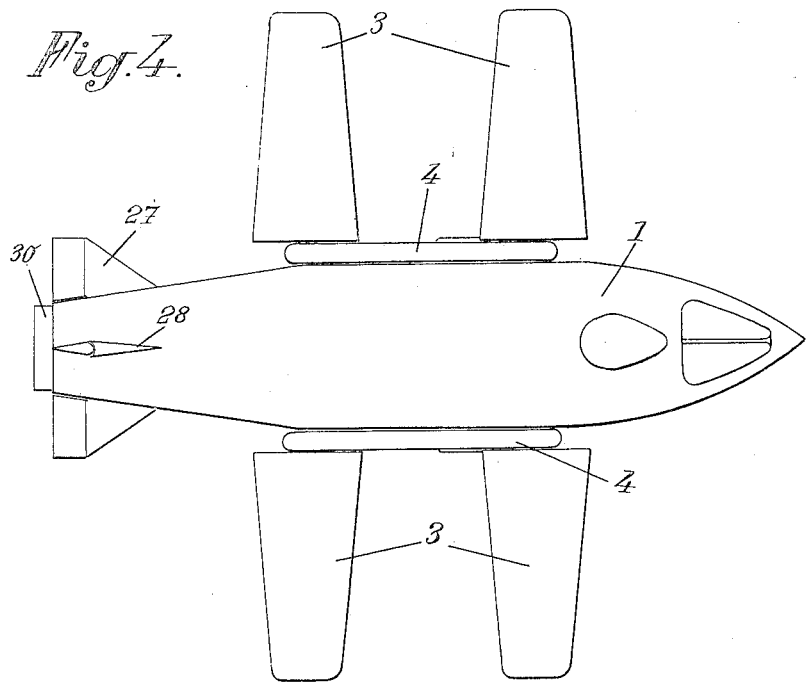
Fig. 4 is a corresponding plan view.
Figure 5:
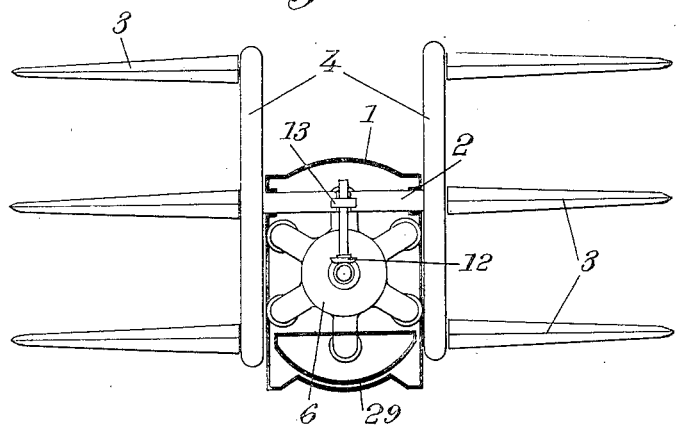
Fig. 5 is a corresponding front view, the nose of the fuselage being cut off.

This aircraft includes, on either side of a fuselage 1, rotors fixed to a common horizontal and transverse shaft 2 which extends through said fuselage. These rotors therefore work in paddle wheel fashion. Each of them includes a plurality of blades 3, for instance three of them pivotally mounted at the ends of radial arms 4 about respective axes 5 parallel to shaft 2.

I provide a mechanism, which will be fully described hereinafter, for imparting cyclic variations of incidence to blades 3, which mechanism is adapted to be controlled by the pilot in such manner that the resultant of the aerodynamic forces acting on said blades is directed either vertically (in which case the rotor merely has a lifting action) or obliquely (in which case the rotor has both a lifting and a propelling action).

Now, according to an essential feature of my invention, I provide, in fuselage 1, at least one turbo-reactor unit including, as usual, a compressor 6 for feeding compression chambers 7, the hot gases flowing out from said chambers driving a turbine 8 mechanically coupled with said compressor and finally issuing into the atmosphere through a jet nozzle 9, and I dispose across said nozzle a receiver element (for instance a turbine 10 coaxial with the rotor of the turbo-compressor) coupled with the aircraft rotor through a shaft 11 driving a bevel gear 12 coupled with the shaft 2 of said rotor through an endless screw transmission 13. Furthermore valve means are provided for sending the combustion gases from chambers 7 either directly into the atmosphere (without passing through turbine 10), in which case the rotor is held in fixed position and acts as a wing system for the aircraft acting as a jet airplane, or, on the contrary, through turbine 10 to drive it, and the rotor with which it is coupled, in rotation.

The valve means in question may consist of an annular element 14 adapted to occupy either of two different positions. For one of these positions (Fig. 6) the hot gases are directed into turbine 10 and the rotor works as a turbo-propeller; in the other position (Fig. 7) the output of turbine 8 is directly connected with the atmosphere and the system works as a conventional turbo-reactor.

This aircraft works as follows:

For taking up and flying at low and mean speeds, valve 14 is in the position of Fig. 6 and the mechanism for controlling cyclic variation of the incidence of aerodynamic of blades 3 works to supply the desired lift and, if necessary, propulsion.

When the speed of flight of the aircraft has reached a sufficient value to enable the aircraft to be aerodynamically supported by blades 3 held in fixed position (Fig. 2) and acting as airplane wings, valve 14 is moved into the position of Figs. 3 and 7, for which the engine unit works as a conventional jet engine. The rotor is, to this effect, first braked (through a brake 15 fitted on the transmission shaft leading from gear 12) then stopped in the desired position, which is for instance marked through any suitable means.

It is pointed out that when the aircraft is working like a jet airplane, the pilot can still differentially vary the angles of incidence of the blades on either side of the fuselage, in order to control lateral stability of said aircraft.

When, on the contrary, the aircraft is slowing down to speeds for which the wing loading is too high, the rotor is again brought into rotation to permit flying at low speeds or vertical displacements.

Although, when landing, it is preferable to rotate the blades until the aircraft is in contact with the ground, a premature stopping of this rotation would not involve serious consequences, for the inclination of the blades would be automatically reversed and the freely rotating rotors would slow down the downward movement of the aircraft.

Finally, on the ground, the apparatus, which may be fitted with wheels, skis, floats or the like, is actuated by its rotors and changers of direction obtained by differential variation of the propelling effect developed by said rotors.

Concerning now the mechanism for controlling the cyclic variation of incidence of blades 3 and their initial relative inclination, it is advantageously made as illustrated by Figs. 8 to 13.

Each blade 3 is controlled by an arm 16, the three arms corresponding to the three blades, respectively, being mounted at 120° to one another on a support 17 which rotates together with the rotor.

Support 17 is journaled on a fixed axis 18 in which is provided a slot 18a for the passage of shaft 2, said slot being intended to enable said axis 18 to assume eccentric positions with respect to shaft 2, inside certain limits.

Mechanical means are provided to produce these variations of eccentricity. For instance, as shown by Fig. 9, piece 18 is guided along a radial rod 19 carried by a part 19a mounted on shaft 2. Furthermore, a lug 18c of piece 18 is provided with a screw threaded bore engaged on a screw 20 in line with rod 19 and driven in rotation by an electric motor carried by part 19a.

Support 17 is mounted in two guiding frames 22 and 23 which enable it to slide in two directions at right angles to each other.

Figure 10:
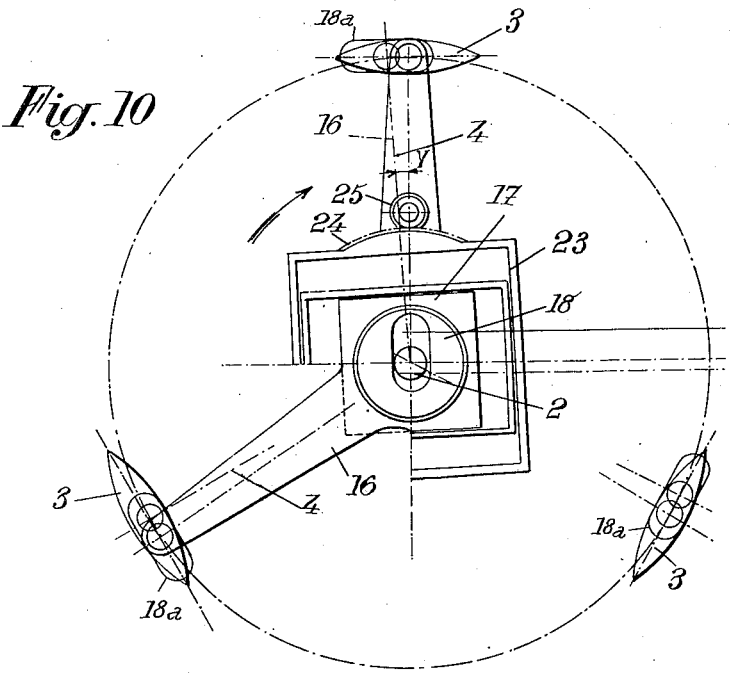

It will be readily understood that, with such a system for controlling the incidence variations of blades 3, said blades will keep the same incidence in the course of their peripheral displacement when the eccentricity of axis 18 is zero, i. e. when said axis is concentric with shaft 2 (Fig. 10).

On the contrary, when part 18 is eccentrically disposed, support 17, which can slide in two directions at right angles to each other owing to its mounting in frames 22 and 23, describes a circle about shaft 2. Arms 16, which are rigid with support 17 compel the points where they are pivotally connected with the respective blades to describe identical circles which cause the desired cyclic variations of incidence of blades 3. The amplitude of these cyclic variations is a function of the common radius of these circles, which increases when said radius and therefore the eccentricity of part 18 increases.

In order to obtain this movement of the blades, each control arm 16 must make an angle Y with the line passing through the center of rotation of the rotor and the point where the corresponding blade is pivoted to its radial arm 4.

If this angle Y becomes zero, blades 3 remain parallel to one another and to a given direction in the course of their circular peripheral displacement. Now, as above explained, this is the result to be obtained when the rotor is to be used as an airplane wing system (position shown by Fig. 13). Therefore, it will be necessary to provide control means for making this angle Y equal to zero when so desired. Such means may be constituted, for instance, by controlling frame 23 in rotation by a mechanism including a gear segment 24 and a pinion 25 actuated by a motor 26.

On the other hand, it should be noted that the direction in which part 18 is eccentrically displaced determines the direction of the resultant of the aerodynamic reactions, which is opposed to the displacement that produces eccentricity. It is therefore necessary, in order to be able to control said resultant, to provide means for modifying the angular position of part 18, which means may be constituted for instance by providing part 18 with a lever 18b actuated through control means not shown.

Figure 11:
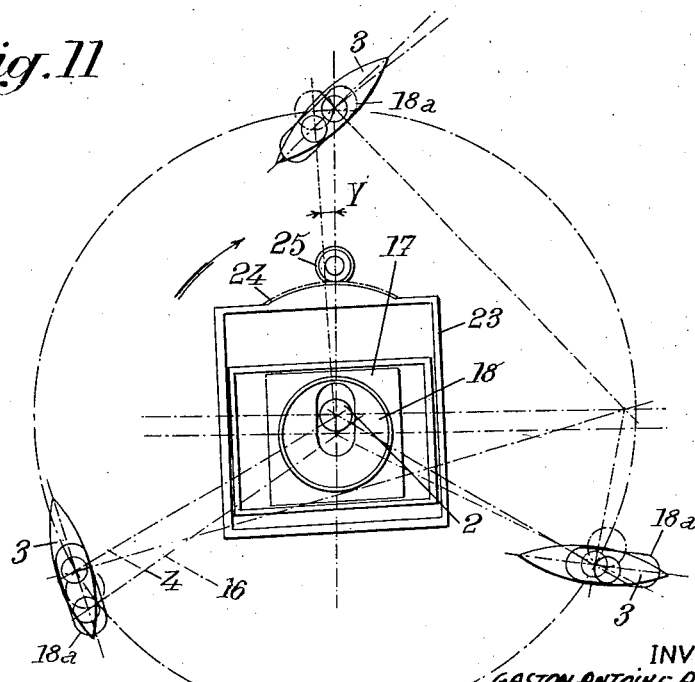

By way of illustration, I have shown the relative positions occupied by several elements of the system for controlling blades 3, Fig. 11 corresponding for instance to the case where the resultant is directed upwardly, and Fig. 12 to the case where the resultant is directed toward the right.

As for auto-rotation of the rotor, it suffices, in order to obtain it, to give part 18 an eccentricity opposed to that corresponding to the obtainment of a vertical upward resultant.

Such an aircraft may further include horizontal and vertical fins 27 and 28, respectively. The fuel tank 29 is preferably disposed along the vertical of the center of gravity of the aircraft.

In order to balance the torque transmitted to fuselage 1 by the rotors, I provide, for instance, at the output of jet nozzle 9, an adjustable deflecting surface 30. Of course, when the rotor is stopped, this deflecting plane 30 is to be restored into neutral position.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

Having thus described the invention, what is claimed as new and desired to be secured by Letters Patent, is:

1. An aircraft which comprises in combination a body, rotary aerodynamic surfaces mounted on said body, mechanical means interposed between each of said surfaces and said body for automatically imparting cyclic variations of incidence to said surfaces in response to rotation thereof with respect to said body to ensure lift and propulsion of said aircraft in air, said means being adjustable and adapted, for one position of adjustment thereof, to give the same incidence to all of said surfaces irrespective of their position along their path of travel, means for holding said surfaces in fixed position with respect to said body, a motor unit capable of generating a continuous stream of gas under pressure, power receiving means operative by said stream of gas for rotating said aerodynamic surfaces with respect to said body, a jet nozzle carried by said body and valve means for directing said stream of gas either toward said power receiving means, for rotating said surfaces, or into said jet nozzle for propelling said aircraft with said aerodynamic surfaces held in fixed position in airplane wing fashion.

2. An aircraft which comprises in combination a body, rotary aerodynamic surfaces mounted on said body, mechanical means interposed between each of said surfaces and said body for automatically imparting cyclic variations of incidence to said surfaces in response to rotation thereof with respect to said body to ensure lift and propulsion of said aircraft in air, said means being adjustable and adapted, for one position of adjustment thereof, to give the same incidence to all of said surfaces irrespective of their position along their path of travel, means for holding said surfaces in fixed position with respect to said body, a turbo-compressor unit capable of generating a continuous stream of gas under pressure, a turbine operative by said stream of gas for rotating said aerodynamic surfaces with respect to said body, a jet nozzle carried by said body and valve means for directing said stream of gas either toward said turbine, for rotating said surfaces, or into said jet nozzle for propelling said aircraft with said aerodynamic surfaces held in fixed position in airplane wing fashion.

3. An aircraft which comprises, in combination, a fuselage, two rotors, each constituted by a set of blades on either side of said fuselage pivotally mounted thereon about a horizontal axis at right angles to the fore-and-aft direction of the aircraft, mechanical means interposed between each of said blades and said body automatically imparting cyclic variations of incidence to said blades in response to rotation thereof with respect to said body to ensure lift and propulsion of said aircraft in air, said means being adjustable and adapted, for one position of adjustment thereof, to give the same incidence to all of said surfaces irrespective of their position along their path of travel, means for holding said surfaces in fixed position with respect to said body, a turbo-compressor unit in said fuselage capable of generating a continuous stream of gas under pressure, a turbine operative by said stream of gas provided in said fuselage for rotating said rotors, a jet nozzle carried by said body, and valve means for directing the stream of gas from said turbo-compressor unit either toward said turbine for rotating said rotors or into said jet nozzle for propelling said aircraft with the blades held in fixed position in airplane wing fashion.

4. An aircraft which comprises, in combination, a fuselage, two rotors, each constituted by a set of blades on either side of said fuselage pivotally mounted thereon about a horizontal axis at right angles to the fore-and-aft direction of the aircraft, mechanical means interposed between each of said blades and said body for automatically imparting cyclic variations of incidence to said blades in response to rotation thereof with respect to said body to ensure lift and propulsion of said aircraft in air, said means being adjustable and adapted, for one position of adjustment thereof, to give the same incidence to all of said surfaces irrespective of their position along their path of travel, means for holding said surfaces in fixed position with respect to said body, a turbo-compressor unit in said fuselage capable of generating a continuous stream of gas under pressure, a turbine operative by said stream of gas provided coaxially with said fuselage for rotating said rotors, a jet nozzle carried by said body, an annular passage along the periphery of said fuselage between the output of said turbo-compressor unit and said nozzle, and an axially slidable annular valve in said passage for directing the stream of gas from said turbo-compressor unit either toward said turbine for rotating said rotors or into said jet nozzle for propelling said aircraft with the blades held in fixed position in airplane wing fashion.

GASTON ANTOINE AUGUSTE WIESSLER.

REFERENCES CITED

The following references are of record in the file of this patent:

UNITED STATES PATENTS

| Number | Name | Date |
|---|---|---|
| 1,722,651 | Wilcox | July 30, 1929 |

FOREIGN PATENTS

| Number | Country | Date |
|---|---|---|
| 500,995 | Great Britain | Sept. 26, 1946 |
| 640,890 | France | Apr. 7, 1928 |